United States Patent [19]
Parr

[11] 3,783,729
[45] Jan. 8, 1974

[54] TOOL HOLDER
[75] Inventor: Edward L. Parr, El Cajon, Calif.
[73] Assignee: Wendell L. Thompson, Burbank, Calif.
[22] Filed: Oct. 26, 1972
[21] Appl. No.: 301,186

[52] U.S. Cl.................... 83/666, 30/390, 144/218, 51/168
[51] Int. Cl............................................. B27b 5/32
[58] Field of Search..................... 83/666, 469, 491; 30/390; 144/288 A, 218; 51/168

[56] References Cited
UNITED STATES PATENTS

| | | | |
|---|---|---|---|
| 1,459,683 | 6/1923 | Norris | 83/666 |
| 2,497,217 | 2/1950 | Hall | 51/168 |
| 3,238,982 | 3/1966 | Darr | 144/288 A |
| 3,656,393 | 4/1972 | Goellner | 83/666 |

Primary Examiner—Donald R. Schran
Attorney—Carl R. Brown et al.

[57] ABSTRACT

A tool holder for circular tools, such as saws, the tool holder having a recess. A sleeve is adapted to be received in the recess, the sleeve having at least two concentric, circular and stepped shoulders that are parallel with the axis of the sleeve, each shoulder being adapted to be received by tools having different and complementary diameter eyes. The holder also having removable means for readily clamping tools thereto.

4 Claims, 6 Drawing Figures

PATENTED JAN 8 1974
3,783,729
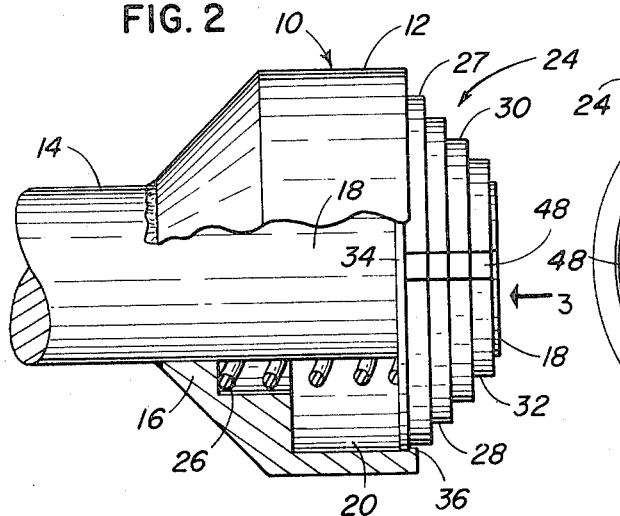
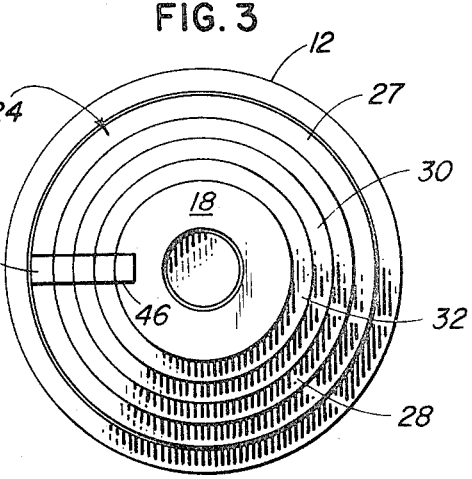
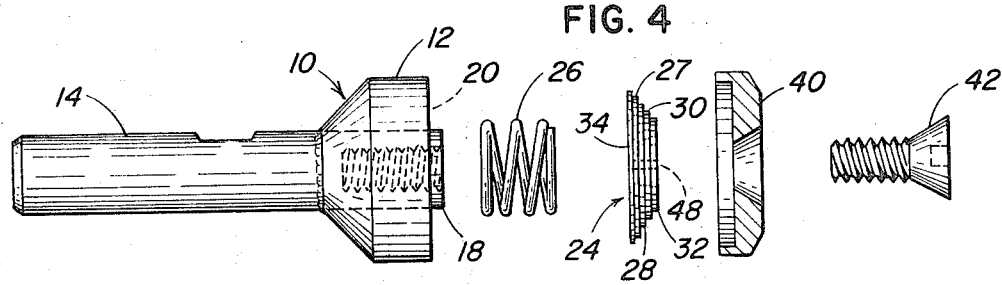
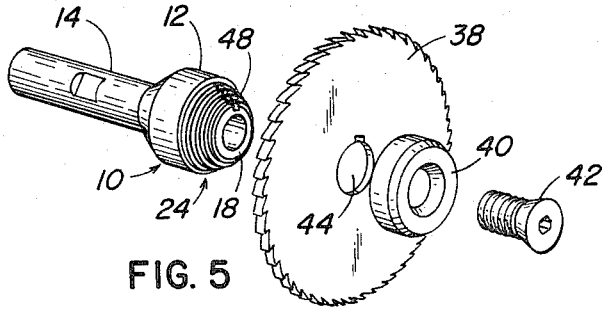
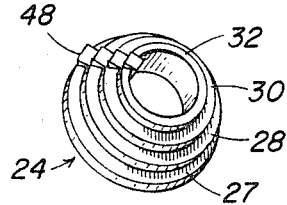

TOOL HOLDER

BACKGROUND OF THE INVENTION

In the field of tool holders that singly hold in position a tool having a centered eye such as circular saws and the like, prior art devices generally employ bevelled surfaces received by the eyes of such saw tools. Such surfaces, when subjected to radial inward pressure that is encountered when pressure is applied to the periphery of the saw being used to cut hard material such as metal, will cause the material about the eye to wear the bevelled surfaces.

Therefore it is advantageous to have a new and improved tool holder that singly holds in position a tool having an eye of one diameter or a tool having an eye of a different diameter by employing stepped and not inclined shoulders.

SUMMARY OF THE INVENTION

The main body of the tool holder is recessed for receiving a sleeve, the sleeve being provided with at least two stepped and circular shoulders, i.e., the shoulders have different diameters, the peripheries of which are of constant diameter.

The sleeve is resiliently urged outwardly through the open end of the recess. A tool retainer is attachable to the main body for clamping the tool to the main body. One shoulder of the sleeve will be received by a tool having a complementary diameter eye, and another shoulder will be received by a tool having a complementary diameter eye.

Other features and the advantages of the present invention will be apparent from the following description, reference being made to the accompanying drawing, wherein a preferred embodiment of the invention is illustrated.

BRIEF DESCRIPTION OF THE DRAWING

FIG. 1 is a side view of the tool holder;

FIG. 2 is a fragmentary view similar to FIG. 1, but partly in section and showing the end cap removed and showing the sleeve that is received by the eyes of various size saws, extended to its outermost position, the view being on a larger scale;

FIG. 3 is an end view looking in the direction of arrow 3 of FIG. 2;

FIG. 4 is an exploded view of the tool holder per se;

FIG. 5 is an exploded view in perspective of the tool holder and one of the saws; and FIG. 6 is a perspective view of the sleeve.

DESCRIPTION OF THE PREFERRED EMBODIMENT

The tool holder includes an integral body 10, the body including a collar 12, a driving shank 14 that extends rearwardly from a rear wall 16 of the body, and a cylinder 18 that extends forwardly from the rear wall 16. Cylinder 18 is encircled by collar 12. The space between the collar and cylinder forms a recess 20.

Some eyes 44 of tools have a key slot 46 extending outwardly from the eye. A stepped key 48 is fixed to the sleeve 24, the key having four sections that extend outwardly and are received, respectively, by the slots of the four different size saws to complement, respectively, the slots in the saws.

From the foregoing it is apparent that I have devised an inexpensive and durable tool holder for cutting tools having different size eyes. All pressures that are imparted inwardly by the tool, such as a saw, are imparted on the surfaces that are at direct right angles with respect to the imparted pressure. Thus, no pressure is imparted to a bevelled surface.

Having described my invention, I claim:

1. A tool holder for cutting tools, the tools being of the type having a centrally disposed eye, said tool holder comprising in combination: A. a body having:
    1. a recess;
B. a sleeve slidably carried in the recess, said sleeve having:
    1. a plurality of circular and constant diameter shoulders, said shoulders progressively decreasing in diameter toward the axis of the sleeve, said shoulders being adapted to extend into complementing size eyes in cutting tools;
C. means for yieldingly urging the sleeve through the opening in the recess;
D. removable means for fixing, respectively, cutting tools to the body.

2. A tool holder as defined in claim 1, characterized in that the removable means (D) includes:
    D. 1. a removable cap engageable with a side of a cutting tool,
    2. means for fastening the cap to the body.

3. A tool holder as defined in claim 1, characterized in that the sleeve-urging means (C) is a compression spring disposed in the recess and interposed between the body and the sleeve.

4. A tool holder as defined in claim 1, characterized in that the saw includes a slot extending outwardly of the eye;
and further characterized in that the sleeve includes:
    B. 2. a key having stepped sections extendible outwardly into the slots of eyes of cutting tools.

* * * * *